United States Patent Office 3,268,491
Patented August 23, 1966

3,268,491
PRODUCTION OF COPOLYMERS OF VINYL ACETATE AND UNSATURATED DICARBOXYLIC ACIDS
Ken-Ichi Hattori and Yoshiaki Komeda, Wakayama, and Yohsuke Ishikawa, Nakano-ku, Tokyo, Japan, assignors to Kao Soap Company, Ltd., Tokyo, Japan, a corporation of Japan
No Drawing. Filed Mar. 26, 1963, Ser. No. 267,965
10 Claims. (Cl. 260—78.5)

The present invention relates to a process for the production of copolymers of vinyl acetate and unsaturated dicarboxylic acids and particularly it relates to a process for the aqueous-phase copolymerization of vinyl acetate with unsaturated $\alpha,\beta$ dicarboxylic acids.

Copolymers of vinyl acetate and an unsaturated $\alpha,\beta$ dicarboxylic acid such as maleic anhydride, are important as dispersing agents, soil aggregating agents, sizing agents, etc., but the synthesis of same has been carried out in an organic solvent, such as benzene, toluene, acetone, and methyl ethyl ketone in the presence of a peroxide catalyst such as BPO. However, it is desirable industrially to carry out the synthesis in an aqueous solvent from the view points of the simplification of the process, the reduction of the production costs, and the prevention of a fire. Hitherto the copolymerization of vinyl acetate with an unsaturated $\alpha,\beta$ dicarboxylic acid in an aqueous solvent has been impossible and successes in the emulsion polymerization or in the aqueous-solution polymerization of these materials have never been reported.

The inventors have found that by carrying out the copolymerization of vinyl acetate and an unsaturated $\alpha,\beta$ dicarboxylic acid in an aqueous solvent at an adjusted pH in the presence of a redox catalyst, a copolymer can be easily obtained having a lower molecular weight than that of a copolymer obtained by a conventional reaction in an organic solvent, said copolymer thus having excellent dispersing properties.

Unsaturated $\alpha,\beta$ dicarboxylic acids are dissociated in water and form $H_3O^+$. For example, maleic anhydride is, when it is dissolved in water, immediately hydrolyzed into maleic acid as shown in the following equation and therefore the polymerizability thereof is reduced;

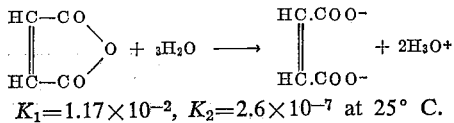

$K_1 = 1.17 \times 10^{-2}$, $K_2 = 2.6 \times 10^{-7}$ at 25° C.

The pH of the aqueous solution of maleic acid is 1–2. The copolymerization of vinyl acetate with maleic anhydride in an aqueous phase is therefore retarded since vinyl acetate is hydrolyzed by the $H_3O^+$ to form acetaldehyde and acetic acid by the following equation;

The result of measuring the degree of hydrolysis of vinyl acetate at various pH's as shown in Table I demonstrates that vinyl acetate is very unstable at a pH lower than 2.

TABLE I.—DECOMPOSITION DEGREE (PERCENT) OF VINYL ACETATE

| Time (hr.) | pH 2 | pH 3 | pH 4 | pH 5 | pH 6 |
|---|---|---|---|---|---|
| 0 | 0.76 | 0.76 | 0.76 | 0.76 | 0.76 |
| 0.5 | 7.6 | 1.03 | 0.965 | 1.32 | 1.22 |
| 1.0 | 13.4 | 2.06 | 2.08 | 2.69 | 1.98 |
| 2.0 | 22.5 | 3.40 | 3.40 | 3.22 | 2.79 |
| 3.0 | 30.8 | 5.08 | 4.52 | 3.75 | 3.55 |
| 4.0 | 35.3 | 5.39 | 4.97 | 4.36 | 4.21 |
| 5.0 | 40.3 | 5.84 | 5.64 | 4.77 | 4.52 |

60±1° C., vinyl acetate, 3.44 g./0.1 mol buffer solution, 200 cc.

As seen from the above table, vinyl acetate is comparatively stable in an aqueous phase at a pH above 3.

In accordance with the present invention, in order to prevent the hydrolysis of vinyl acetate, an unsaturated $\alpha,\beta$ dicarboxylic acid in an aqueous solution is partially neutralized with an alkali such as sodium hydroxide into almost the mono-sodium salt and the copolymerization of vinyl acetate with the unsaturated $\alpha,\beta$ dicarboxylic acid is carried out in the presence of a redox catalyst at a pH near about 4.2, the pH corresponding to the mono-sodium salt, or at a pH of 3–6 (above 80% of the mono-sodium salt), most preferably at a pH of 4–5 (above 95% of the mono-sodium salt). By the process of this invention the copolymerization can be carried out in an aqueous phase and a copolymeric surface active agent can be obtained having a dispersibility which is the same as or higher than that of a copolymer obtained by a conventional method using an organic solvent such as benzene. For example, maleic acid can be present in the form of a non-dissociated acid, a 1st-step dissociated acid, and a 2nd-step dissociated acid and the ratios (mole percent) of each form of maleic acid in aqueous solutions of various pH's are listed in the following table.

TABLE II.—RATIO (MOLE PERCENT) OF EACH FORM OF MALEIC ACID

| Forms of maleic acid | pH 3 | pH 4 | pH 5 | pH 6 | pH 7 |
|---|---|---|---|---|---|
| Non-dissociated acid | 7 | 1 | | | |
| 1st-step dissociated acid | 93 | 99 | 97 | 80 | 27 |
| 2nd-step dissociated acid | | | 3 | 20 | 73 |

25° C., $K^1 = 1.17 \times 10^{-2}$, $K^2 = 2.6 \times 10^{-7}$.

As shown in Table II, the 1st-step dissociated product of the unsaturated $\alpha,\beta$ dicarboxylic acid (a mono-sodium salt, a mono-potassium salt, a mono-ammonium salt, etc.), is predominant at a pH of 3–6, that is, more than 80% of the unsaturated $\alpha,\beta$ dicarboxylic acid is present in the form of by the 1st-step dissociated acid. It was found that, when the copolymerization of vinyl acetate with an unsaturated $\alpha,\beta$ dicarboxylic acid in an aqueous phase is carried out in a system wherein the 1st-step dissociated product of the unsaturated $\alpha,\beta$ dicarboxylic acid is present in a ratio above 80%, preferably in a ratio of 95% to near 100%, by adjusting the pH of the aqueous phase to 3–6, or most preferably 4.0–5.0, vinyl acetate is not decomposed. The reaction rate of the copolymerization becomes maximum in the case when an alkali salt of a 1st-step dissociated acid of an unsaturated $\alpha,\beta$ dicarboxylic acid, such as, the mono-sodium salt and the mono-potassium salt, is 100%, and it becomes smaller as the content of the 1st-step dissociated product becomes less.

The above pH may be adjusted by using a hydroxide of an alkali metal or an alkali earth metal, such as, sodium hydroxide, potassium hydroxide, and calcium hydroxide, or ammonia. In addition, as the presence of heavy metal ions in the aqueous phase remarkably hinders the reaction, it is desirable to use distilled water.

If a redox catalyst is not used in the copolymerization in an aqueous solution according to the invention, radicals may be formed but as the reaction rate of the copolymerization is extremely slow, it is impossible to carry out the practical reaction industrially. It is preferable to use a persulfate as an oxidizing agent of the redox catalyst and an acid sulfite, a sulfite or a thiosulfate as a reducing agent to be combined with the oxidizing agent. For example, a combination of potassium persulfate or ammonium persulfate with acid sodium sulfide may be used. The amount of the catalyst is suitably 3–15% of the whole amount of monomers in the reaction system. As an unsaturated α,β dicarboxylic acid, any acid which is copolymerizable with vinyl acetate can be used in the process of this invention, but the preferable unsaturated α,β dicarboxylic acids are maleic acid, fumaric acid, itaconic acid, and mesaconic acid.

In the process of this invention, further, the mole ratio of a vinyl acetate monomer to an unsaturated α,β dicarboxylic acid monomer can be suitably selected within a range of 8:2 to 2:8. For example, in the case of carrying out the reaction of vinyl acetate with maleic acid in various mole ratios at a temperature of 60±2° C. and a pH of the aqueous phase of 4.2 and the whole monomer concentration of 0.6 mole/l. by using as the redox catalyst 0.02 mole/l. of potassium persulfate and 0.01 mole/l. of acid sodium sulfite, the ratios of vinyl acetate to maleic acid in the products are as follows:

TABLE III

| Vinyl acetate, mole/l. | Maleic acid, mole/l. | Vinyl acetate/ maleic acid in product [1] | Yield of copolymer (percent after 4 hrs.) |
|---|---|---|---|
| 0.48 | 0.12 | 1.2 | 35.9 |
| 0.36 | 0.24 | 0.9 | 60.4 |
| 0.30 | 0.30 | 0.9 | 59.8 |
| 0.24 | 0.36 | 0.9 | 59.7 |
| 0.12 | 0.48 | 1.0 | 29.9 |

[1] Calculated from sulfated ash content.

The mole ratio of vinyl acetate to an unsaturated α,β carboxylic acid that is most suitable as a practical condition for an industrial purpose is about 1:1.

As seen in Table III, in the invention, even if the monomer ratio of vinyl acetate to maleic acid is changed within a range of 4:1 to 1:4 at a pH of, e.g., 4.2, the ratio of vinyl acetate to maleic acid in the product is constant, i.e. about 1:1. A copolymer obtained by a conventional reaction in an organic solvent is a so-called alternative polymer having generally a molecular weight of above 10,000 and a vinyl acetate to maleic acid ratio of 1:1, while in the process of this invention, a copolymer having a molecular weight of 700–6,000 and a vinyl acetate to maleic ratio of 1:1 can be obtained. Such a copolymer has never been reported.

As the monomer concentration in the reaction system of the invention at the beginning, 5–100 parts of whole monomers may be used to 100 parts of water, but the preferable amount of monomers is 20–40 parts in practice. The reaction may be carried out at a temperature above 30° C., but the most suitable reaction temperature is 50–74° C.

The new copolymer obtained by the process of the present invention may be in the form of an aqueous solution or a dried powder. The powder has very high hygroscopicity. The product of this invention is an excellent dispersing agent for cement, titanium white, barium carbonate, kaolinite, pyrophylite, Hansa Yellow and other hydrophilic powders. Therefore, the products of this invention can be used widely as a high molecular weight water-soluble surface active agent, particularly as a dispersing agent in the fields of paints, pigments, colors, drugs, agricultural chemicals dyeing agents, ceramics, and cements.

*Example 1*

Solutions were formed by dissolving 7.5 g. of maleic anhydride and 6.5 g. of vinyl acetate in 250 cc. of distilled water and the maleic acid in the solutions was partially neutralized with sodium hydroxide to give solutions having a pH of 3, 4, 5, 6, 7, and 8 (at room temperature). Each of the solutions was placed in a four-neck flask and the air in the flask was replaced with nitrogen. After adding as the polymerization catalyst 1.4 g. of potassium persulfate and 0.26 g. of acid sodium sulfide, the polymerization was carried out at 60° C. The yield of copolymer was maximum at a pH of 4.0 to 5.0 (containing above 95% of the mono-sodium salt of maleic acid) and color of the polymerization system was better as the pH became higher. The yield and the apparent color of the copolymer at each pH were as listed in Table IV.

TABLE IV

| PH | Yield of copolymer (Percent after 5 hrs.) | Color [1] |
|---|---|---|
| 3 | 32.1 | G+4 |
| 4 | 67.5 | G+1∼0 |
| 5 | 75.5 | G−2∼−3 |
| 6 | 33.2 | G+1 |
| 7 | 17.7 | G−2 |
| 8 | 16.4 | G−4∼−5 |

[1] The apparent color of the reaction solution was shown by Gardner Number.

*Example 2*

Into 500 cc. of water was dissolved 49 g. of maleic anhydride and after adding 2 g. of sodium hydroxide to form the mono-sodium salt, 43 g. of vinyl acetate was added into the solution at a pH of 3.8. While adding 2.28 g. of potassium persulfate and 1.04 g. of acid sulfite as a redox polymerization starting agent, the temperature of the reaction system was increased to 60° C. and the polymerization was carried out for 8 hours at the same temperature. The reaction product was then cooled and filtered. The filtrate was concentrated in vacuum and subjected to spray drying to give 110 g. of a product. As the results of tests to determine the dispersibility of the product, it was found that the dispersibility of the product to titanium white is almost same as that of a copolymer obtained by a conventional process using benzene. The product had also excellent dispersibility for various kinds of pigments. The molecular weight of the product purified by an alcohol precipitation method was about 3,000 and the vinyl acetate to maleic acid ratio in the copolymer was 1:1.

The results of the comparison tests of the dispersibility of the product with conventional dispersing agents are shown in Tables V, VI and VII.

TABLE V.—DISPERSION TEST FOR CaCO₃ [1]

| Dispersing agent: | Dispersibility |
|---|---|
| Not added | 26.7 |
| Sodium salt of naphthalene sulfonic acid-formalin condensate | 31.4 |
| Sodium salt of creosote oil sulfonic acid-formalin condensate | 27.4 |
| Sodium lignin sulfonate | 38.7 |
| Sodium tripolyphosphate | 38.1 |
| Polyvinyl alcohol | 26.1 |
| The product of Example 2 | 41.9 |

[1] 22–23° C., 3 hours (from sediment graph) (CaCO₃ 10 g., dispersing agent 20 mg., and distilled water 400 cc.).

TABLE VI.—COMPARISON OF DISPERSIBILITY FOR TiO₂

| Dispersing agent: | Amount of absorbed water [1] |
|---|---|
| The product of Example 2 | 0.56 |
| Tripolyphosphate | 0.98 |
| Polyvinyl alcohol | 0.95 |
| CMC | 1.10 |
| Sodium lignin sulfonate | 0.94 |
| Sodium salt of naphthalene sulfonate-formalin condensate | 1.00 |
| Sodium laurylsulfate | 1.32 |
| Polyoxyethylene nonyl phenyl ether ($\bar{P}=13$) | 0.99 |
| No dispersing agent | 1.35 |

[1] Amount of absorbed water (cc./g.) when 1% of the dispersing agent was added.

TABLE VIII.—VISCOSITY REDUCING POWER TO A SLURRY OF BaSO₄[1]

| Concn. of dispersing agent, percent | the product of the invention (Example 2), cp. | C.M.C., cp. |
|---|---|---|
| 1.0 | 7.5 | 426.0 |
| 0.5 | 87.4 | 93.9 |
| 0.4 | 121.5 | 105.0 |
| 0.3 | 1,236.0 | 125.0 |
| 0.1 | 2,370.0 | 800.0 |

[1] 50% conc. slurry, 37° C., viscosity (cp.) measured by Brookfield Viscosimeter.

*Example 3*

65 g. of itaconic acid was dissolved into 500 g. of water and after adding 20 g. of sodium hydroxide to form the mono-sodium salt, 43 g. of vinyl acetate was added into the solution at a pH of 4. After adding 2 g. of ammonium persulfate and 1 g. of acid sodium sulfite as a redox polymerization starting agent, the reaction was carried out at 65° C. After that, 1 g. of ammonium persulfate and 0.5 g. of acid sodium sulfite were added into the solution in every 2 hours 5 times and after 24 hours 635 g. of an aqueous solution of a copolymer with a concentration of 21% was obtained. The viscosity reducing power of the product to a titanium white slurry (60%) was 220 cp. at 20° C. in the concentration of the dispersing agent of 0.005%.

What is claimed is:

1. A process for producing water-soluble copolymers of vinyl acetate and an unsaturated α,β-dicarboxylic acid and a monoalkali half salt thereof, said copolymers having a molecular weight of about 700–6000 and a ratio of vinyl acetate to unsaturated α,β-dicarboxylic acid of about 1:1, which comprises: reacting together in an aqueous solution and in the presence of a redox catalyst (a) vinyl acetate and (b) an unsaturated α,β-dicarboxylic acid at least about 80% of which is present in the form of a monoalkali salt, the mole ratio of the unsaturated α,β-dicarboxylic acid to the vinyl acetate in the reaction solution being from 2:8 to 8:2 and the combined weights of the unsaturated α,β-dicarboxylic acid and the vinyl acetate being from 5–100 parts for each 100 parts of water, the redox catalyst being present in an amount of 3–15% by weight based on the combined weights of the unsaturated α,β-dicarboxylic acid and the vinyl acetate, the aqueous solution being at a pH of 3–6 and the reaction being carried out at a temperature above 30° C.

2. A process according to claim 1, in which the reaction is carried out at a temperature of 50–74° C.

3. A process according to claim 1, in which the pH of the aqueous solution is established at between 3–6 by adding to the solution a hydroxide of a metal selected from the group consisting of alkali metals and alkaline earth metals.

4. A process according to claim 3, in which the hydroxide is sodium hydroxide.

5. A process according to claim 1, in which the pH of the aqueous solution is established at between 3–6 by adding ammonia to the solution.

6. A process according to claim 1, in which the unsaturated α,β-dicarboxylic acid is maleic anhydride.

7. A process according to claim 1, in which the unsaturated α,β-dicarboxylic acid is itaconic acid.

8. A process according to claim 1, in which the combined weights of the unsaturated α,β-dicarboxylic acid and the vinyl acetate are from 20–40 parts for each 100 parts of water.

9. A process according to claim 1, in which the redox catalyst consists of a persulfate and a member selected from the group consisting of acid sulfite, sulfite, and thiosulfate.

10. A process according to claim 1, in which the redox catalyst consists of a member selected from the group consisting of potassium persulfate and ammonium persulfate, together with acid sodium sulfite.

References Cited by the Examiner
UNITED STATES PATENTS

| 2,434,054 | 1/1948 | Roedel | 260—78.5 |
| 2,643,246 | 6/1953 | Wilson | 260—78.5 |

JOSEPH L. SCHOFER, *Primary Examiner.*

L. WOLF, *Assistant Examiner.*